Dec. 20, 1966 | J. H. VELDKAMP | 3,293,362

ENCODING KEYBOARD

Filed June 28, 1963 | 8 Sheets-Sheet 1

Dec. 20, 1966 J. H. VELDKAMP 3,293,362

ENCODING KEYBOARD

Filed June 28, 1963 8 Sheets-Sheet 2

Dec. 20, 1966 J. H. VELDKAMP 3,293,362

ENCODING KEYBOARD

Filed June 28, 1963 8 Sheets-Sheet 3

Dec. 20, 1966 J. H. VELDKAMP 3,293,362

ENCODING KEYBOARD

Filed June 28, 1963 8 Sheets-Sheet 4

Dec. 20, 1966 J. H. VELDKAMP 3,293,362

ENCODING KEYBOARD

Filed June 28, 1963 8 Sheets-Sheet 6

United States Patent Office 3,293,362

Patented Dec. 20, 1966

3,293,362

ENCODING KEYBOARD

Jean Herman Veldkamp, Noord, Netherlands, assignor to Compagnie des Machines Bull (Société Anonyme), Paris, France Filed June 28, 1963, Ser. No. 291,313
Claims priority, application France, July 5, 1962, 903,037
5 Claims. (Cl. 178—79)

Figure 2:
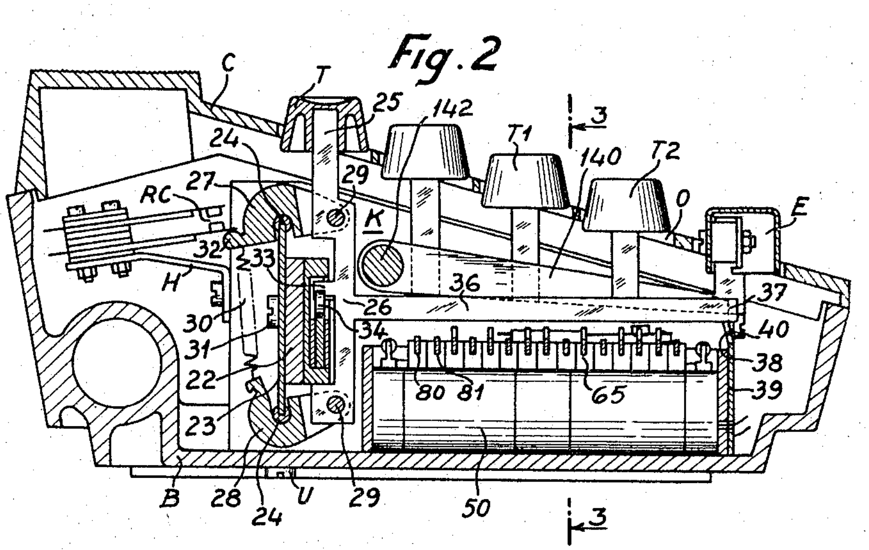

The present invention relates to improvements in electric encoding keyboards and more particularly to keyboards for the transmission of alphabetical and numerical data or of control signs or indications by means of electric currents transmitted through a number of conductors which are energised either separately or in combination in accordance with code combinations through the said keyboard.

Encoding keyboards are known in which electric contacts are closed through encoding bars formed with notches having an oblique flank, the said bars being disposed perpendicularly to so-called actuating bars which are each mechanically connected to a key of the keyboard and disposed in such manner that depression of the key and of the corresponding actuating bar results in shifting of certain encoding bars by the action exerted by the depressed actuating bar on the oblique flank of notches formed in predetermined positions in the encoding bars. The shifting of these bars results in closing of corresponding electric contacts in accordance with a coded combination.

Electric encoding keyboards are also known in which encoding bars and actuating bars are disposed perpendicularly to one another and are formed with notches which are so positioned that the depression of a key engages an actuating bar in notches and locks some encoding bars, while other encoding bars, which remain free, can be shifted longitudinally under the action of one or more electromagnets and close one or more electric contacts in accordance with a predetermined code combination.

Keyboards operating in accordance with either of the aforesaid principles have the disadvantage that the actuating bars must transmit or withstand a force directed perpendicularly to the said bars, which necessitates very rigid and therefore thick actuating bars, for which there must be provided in the encoding bars very wide notches which do not render possible the construction of keyboards with small overall dimensions.

The invention relates to improvements which have the object of obviating these disadvantages and of making it possible to produce multi-code keyboards of smaller dimensions which are capable of supplying a very large number of coded combinations owing to simple arrangements which ensure completely rational utilisation of the space along the actuating bars and along the encoding bars. A keyboard designed in accordance with the invention comprises in addition features by means of which it is possible readily and rapidly to change the codes which can be used with the said keyboard by simply replacing an interchangeable unit which comprises the set of encoding bars. This unit, which is of simple construction, of small overall dimensions and of low weight, comprises only a minimum number of the parts of the whole encoding keyboard and is thus of minimum cost.

An electric encoding keyboard designed in accordance with the invention comprises in principle three separate parts:

(1) The keyboard proper with its keys and their guide and return mechanisms, the encoding keys being fast with the actuating bars disposed above and perpendicularly to the encoding bars of the keyboard.

(2) The unit comprising the encoding bars disposed below the actuating bars and arranged in such manner that the depression of an encoding bar engages an intermediate member, disposed below it, in a groove formed in the movable armature of a contact-actuating electromagnet.

(3) A supporting frame adapted to receive and guide the encoding bar unit, the devices comprising intermediate members and the electromagnet controlling the closing of electric contacts through the intermediate members engaged in the armature of the said electromagnet.

The supporting frame is provided with a contact for energising the electromagnet and with contacts which can be actuated directly by keys of the keyboard in order to control, for example, functions of machines. The supporting frame is provided also with members which, under the action of special keys of the keyboard or by means of an electromagnet, serve to determine the positioning of the encoding bar unit in the said supporting unit in order to set in operation a chosen code.

By assembly of appropriate standard elements, it is thus possible to produce greatly varying keyboard designs by means of which it is possible to control machines such as accounting machines, printing machines (typewriters), statistical machines, electronic computers, card or record-tape punchers, etc., which may be controlled by the use of various codes. Such a keyboard may also be incorporated in a machine and even be connected to other machines successively through appropriate switching means.

Figure 1:
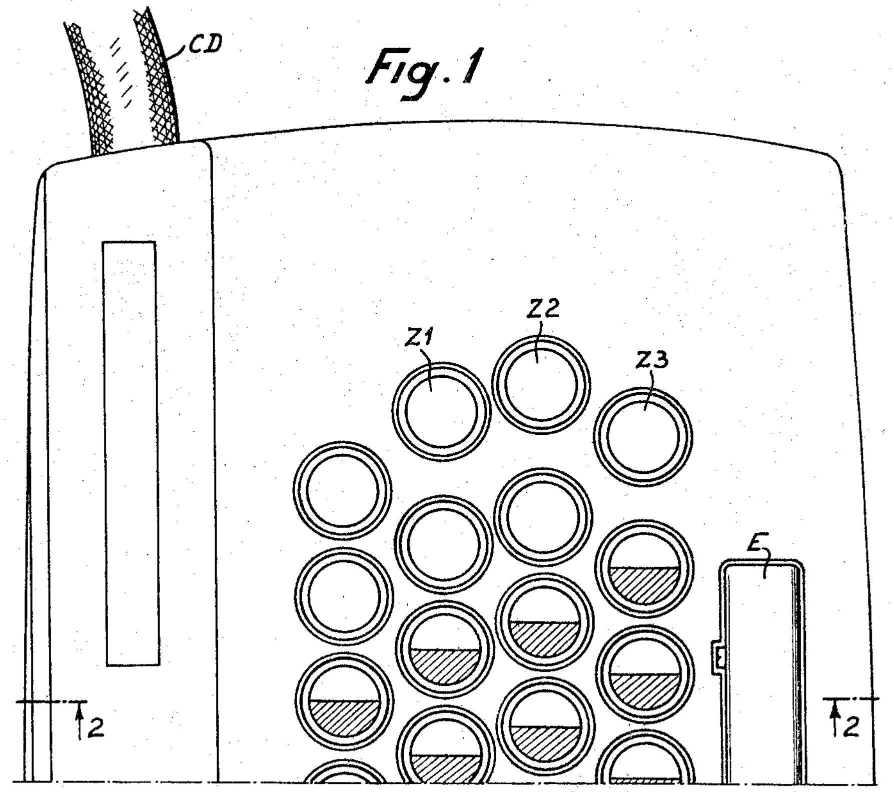
Figure 3A:
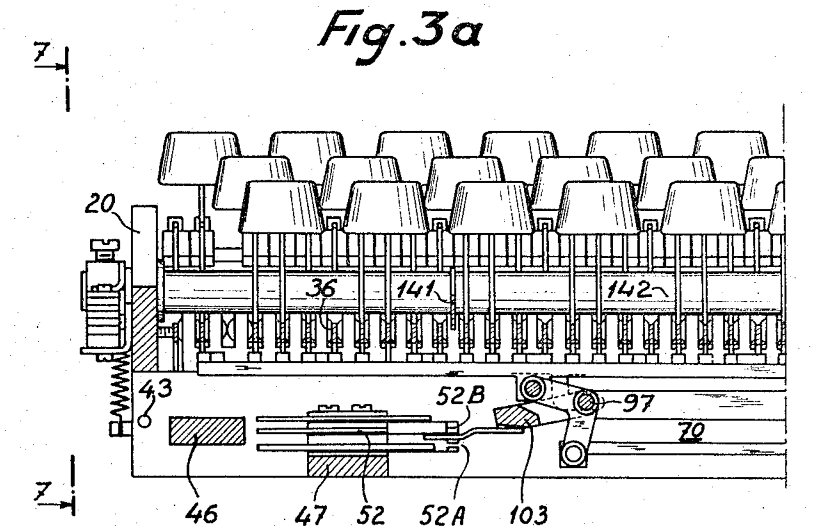
Figure 4A:
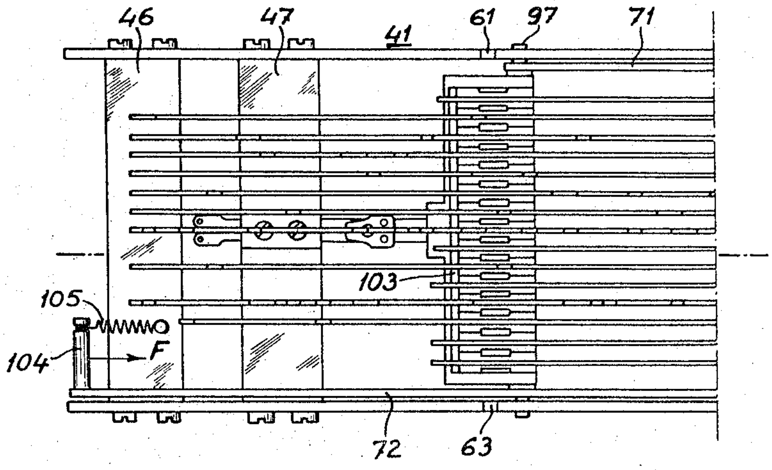
Figure 3B:
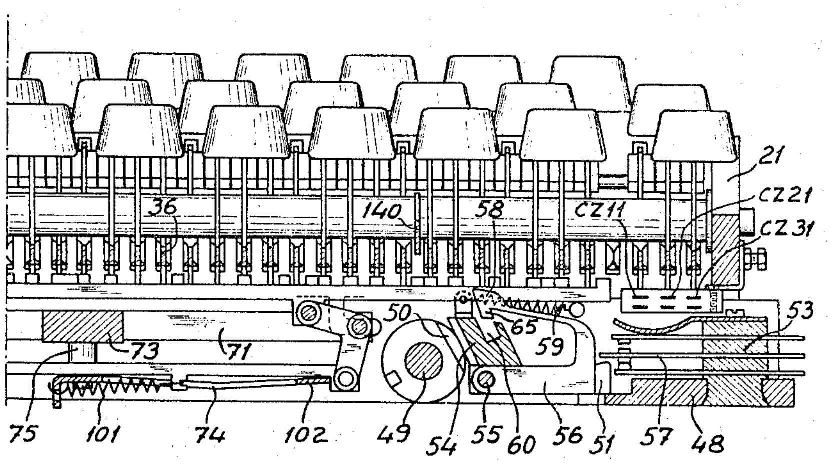
Figure 4B:
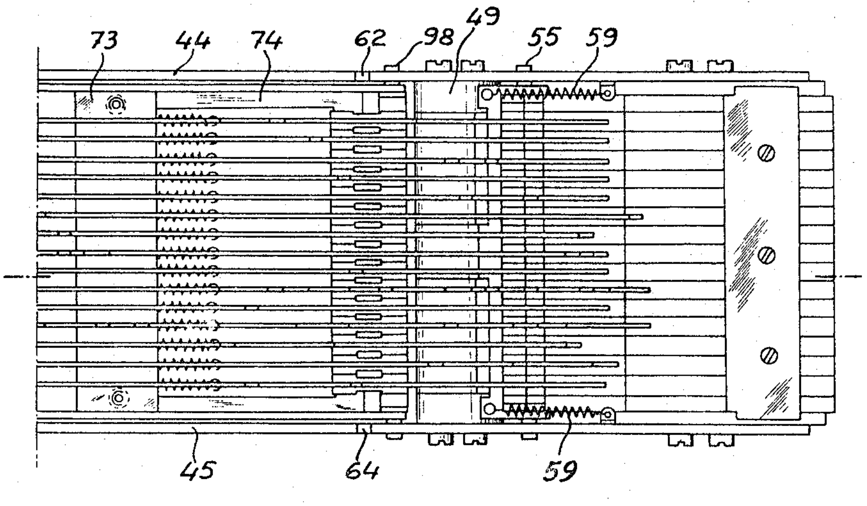
Figure 6:
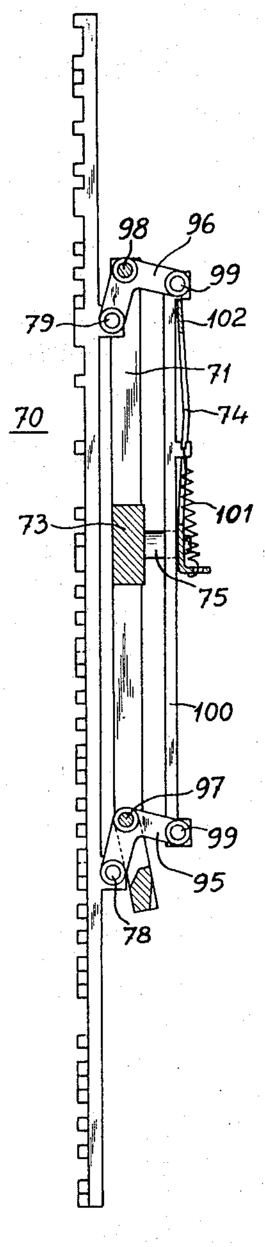
Figure 5:
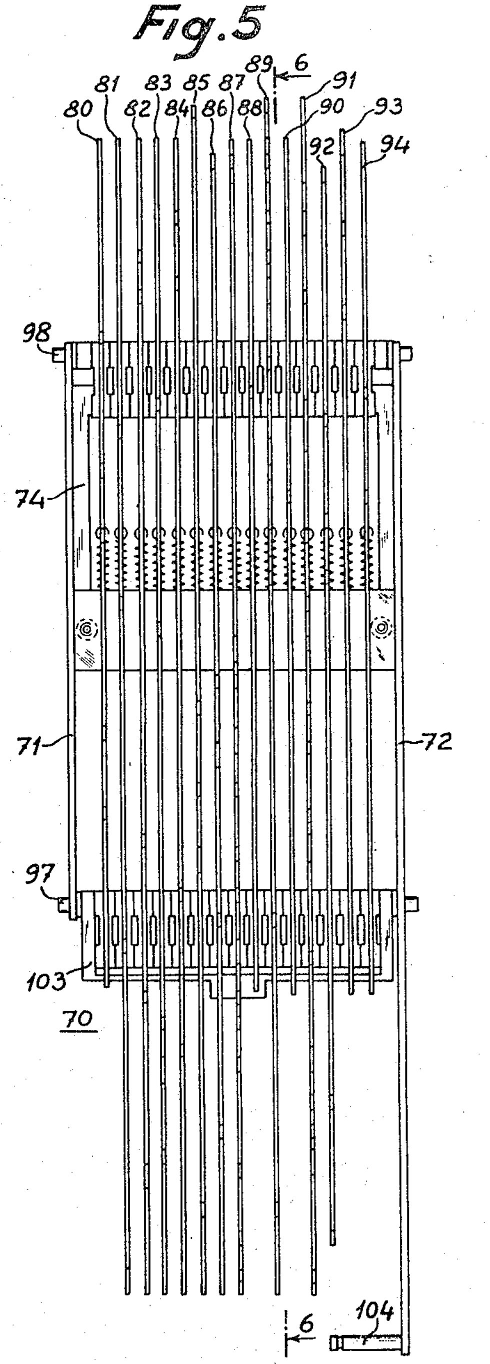
Figure 7:
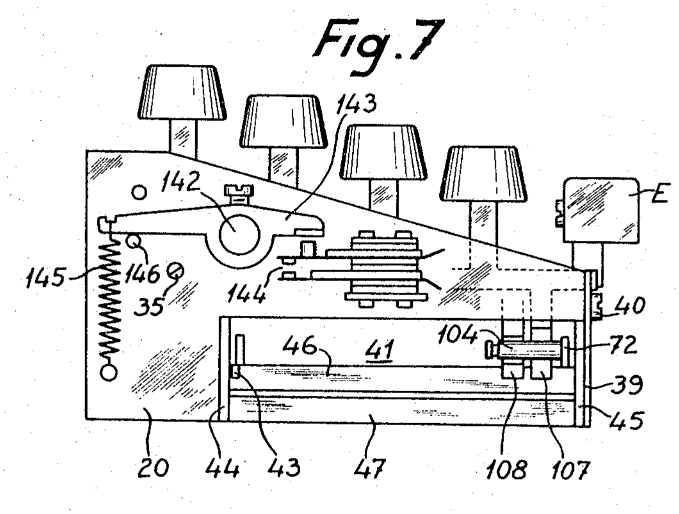
Figure 8:
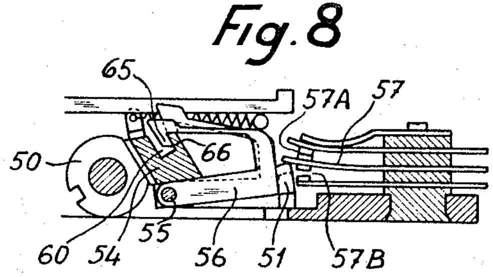
Figure 9B:
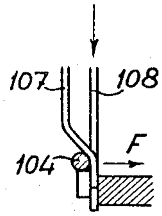
Figure 9A:
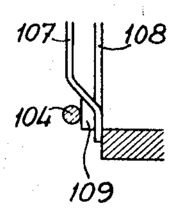
Figure 10:
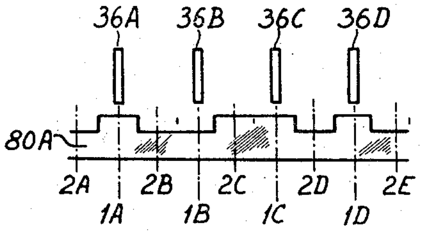
Figure 11:
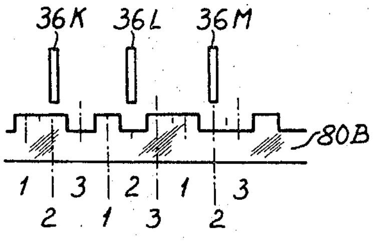
Figure 16:
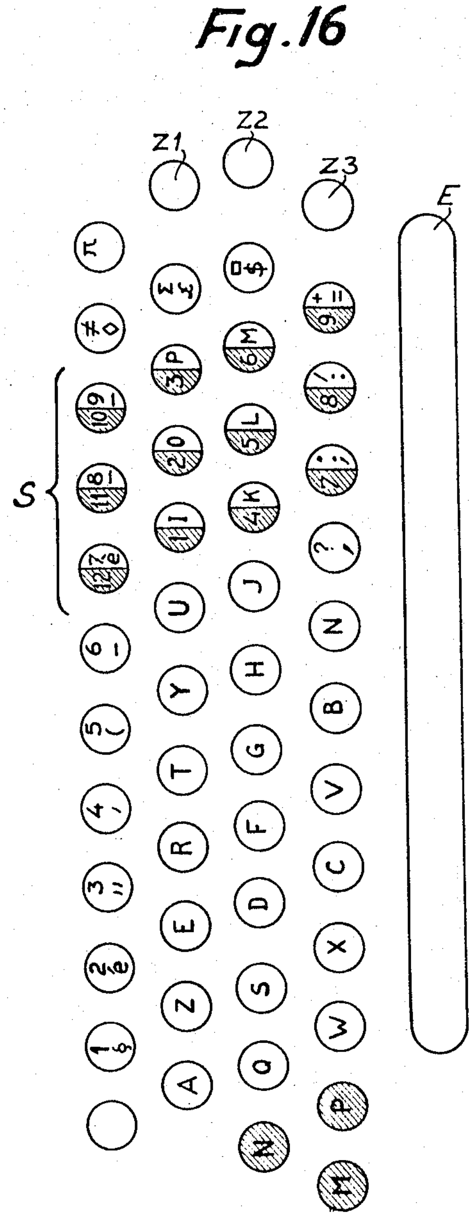
Figure 17:
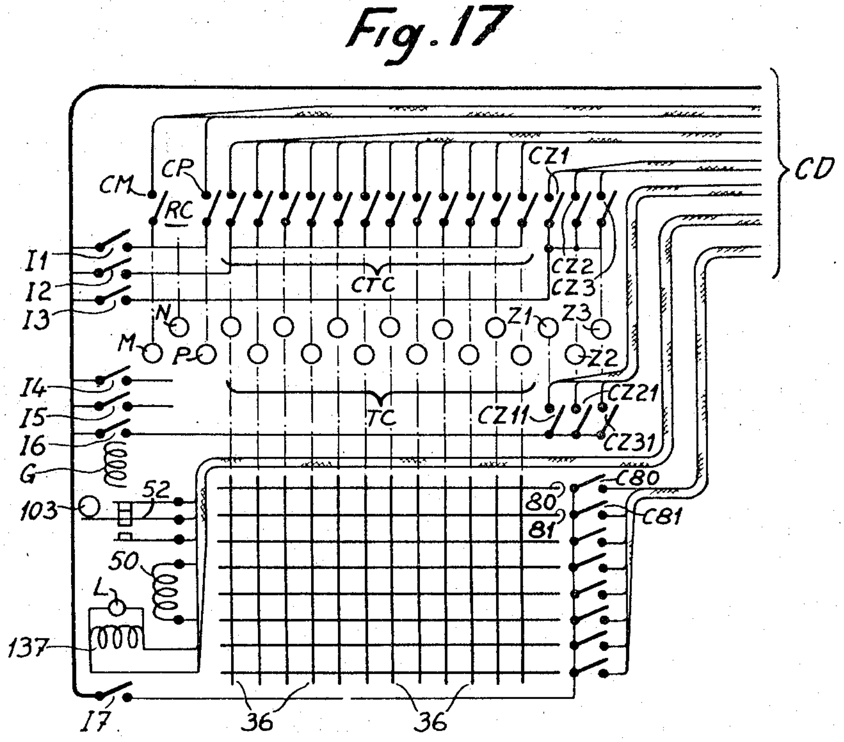
Figure 18:
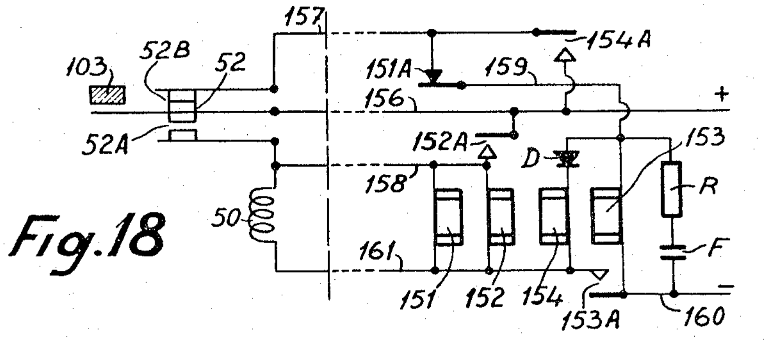
Figure 19:
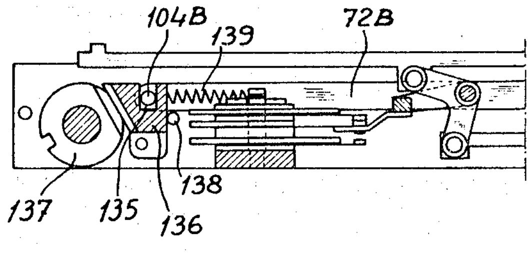

For a better understanding of the invention, and the manner in which it may be performed, an embodiment thereof will now be described, by way of example, with reference to the accompanying drawings, in which:

FIGURE 1 is a fragmentary plan view of a connectable keyboard mounted in a casing, as seen from the outside, FIGURE 2 is a sectional view of the keyboard along the line 2—2 of FIGURE 1, FIGURES 3*a* and 3*b* illustrate in combination a longitudinal sectional view, along the line 3—3 of FIGURE 2, through the mechanism of the keyboard, FIGURES 4*a* and 4*b* illustrate in combination the whole of an encoding bar unit mounted in a supporting block, as seen in plan view, FIGURE 5 illustrates an encoding bar unit alone, as seen in plan view, FIGURE 6 is a sectional view along the line 6—6 of the encoding bar unit illustrated in FIGURE 5, FIGURE 7 is a view of the mechanism illustrated in FIGURES 3*a* and 3*b*, as seen along the line 7—7 of FIGURE 3*a*, FIGURE 8 is a detailed view of the parts of the mechanism for controlling the encoding contacts which are illustrated in another position in FIGURE 3*b*, FIGURES 9A and 9B illustrate a manually controlled shift mechanism for an encoding bar unit having two positions, FIGURE 10 illustrates an example of the arrangement of a part of a two-position encoding bar in relation to actuating bars, FIGURE 11 illustrates a part of an encoding bar having three encoding positions, FIGURES 12 to 15 are various views of a key mechanism for the manual positioning of a three-position encoding bar unit, FIGURE 16 illustrates an arrangement of the code-selecting keys for a keyboard provided with three-position encoding bars, FIGURE 17 is a diagram illustrating the principle of the wiring of a connected encoding keyboard, FIGURE 18 is a control circuit diagram for the actuating electromagnet of a control keyboard for an acyclically operating machine, and FIGURE 19 illustrates an electromagnetic device for controlling the positioning of an encoding unit.

The keyboard partly illustrated in FIGURES 1, 2 and 3*a*–3*b* comprises (FIGURE 2) a mechanism K which is secured to the base of a casing B closed by a cover C. The cover C is formed with apertures O for the passage of the keys T, T1, T2, . . . and of a space bar E. In order to simplify the drawings, the electrical connections to the various contact members of the keyboard are not shown in these figures. For this, reference will be made to the diagram of FIGURE 17. However, FIGURE 1 shows a part of a cable CD which extends from the casing and serves for electrically connecting the keyboard to a machine when the controlled machine is separate from the keyboard. The keyboard mechanism illustrated in FIGURES 2, 3*a* and 3*b* comprises two side pieces 20 and 21 secured (FIGURE 2) to the base of the casing by screws U. The side pieces are assembled together by a supporting bar 22 which supports the mechanism of the keys.

Each key mechanism comprises a key T fitted on to a tongue 25 formed in a plate 26 which is fast with riders 27 and 28 through pins 29 extending through the plate 26. The riders of one key are maintained together by a spring 30, which applies them against packings 24 fast with a plate 23 secured to the supporting bar 22 by screws 31. The riders are so shaped that the resultant action of the spring 30 on the two riders supporting a key tends to maintain the said key in an upper position. The plate 26 of each of the encoding keys of the keyboard is provided with a tongue 33 engaged in a device 34 comprising rollers, constructed in accordance with a known principle, which is adjustable by means of a screw 35 (FIGURE 7) so as to permit the depression of only one encoding key at a time. The plate 26 of each of the encoding keys of the keyboard is provided with an actuating bar 36 which is disposed perpendicularly above the encoding bars. The end 37 of each actuating bar is engaged in a notch 38 in a guide plate 39 secured to the side pieces 20 and 21 by screws 40 (FIGURES 2 and 7). A supporting frame 41 (FIGURE 7) is maintained between the side pieces 20–21 and the guide plate 39 by means of studs 43 (FIGURES 3*a* and 7) engaged in apertures in side plates 44 and 45 which are connected together by bracing members 46–47, 48 and by the fixed armature 49 of the electromagnet 50.

The bracing member 47 supports the elements of a two-way contact 52 and the bracing member 48 supports a row 53 of two-way encoding contacts. The movable armature 54 of the electromagnet 50 is adapted to pivot about a pin 55 fast with the side plates 44 and 45. Intermediate members 56 of plastic insulating material are arranged to pivot also about the pin 55. Each intermediate member is provided with a lip 51 arranged to act on the central blade 57 of a two-way contact. Springs 59 return the movable armature 54 of the electromagnet 50. Each intermediate member 56 is provided with a split head 58 in which there is engaged an encoding bar (FIGURE 3*b*), and with a cranked end 65 adapted to be engaged in a longitudinal slot 60 in the movable armature 54 of the electromagnet by depression of the encoding bar corresponding to the intermediate member.

The side plates 44 and 45 of the supporting frame 41 are formed with L-shaped notches 61, 62, 63 and 64 to receive the encoding unit 70 (FIGURES 3*a*–3*b*, 4*a*–4*b*, 5 and 6) and to permit the introduction of the said encoding unit into the supporting frame 41 and shifting thereof in the latter. The encoding unit comprises two longitudinal members 71 and 72 held together by a transverse member 73. A frame 74 is secured to the transverse member 73 by bracing members 75. Encoding bars 80 to 94 (FIGURE 5) are mounted by means of pins 78–79 on bell-crank levers 95–96 pivotally mounted on pins 97–98 fast with the longitudinal member 71–72. The bell-crank members coupled to a common encoding bar connected by pins 99 to a connecting bar 100. The latter bar is connected to the frame 74 by a spring 101. Under the action of the springs 101, the bars 100 connecting the encoding bars are drawn against the abutment bar 102 of the frame 74. In FIGURES 4*a* and 4*b* the pins 97–98 of the encoding bar unit are engaged in the notches 61, 62, 63 and 64 in the side plates of the supporting frame. Disposed below the encoding bars is a contact-closing bar 103 pivotally mounted on the pin 97 (FIGURE 6) and resting (FIGURE 3*a*) on the central blade of the contact 52.

The longitudinal member 72 (FIGURES 4*a*, 5 and 7) is provided with a bar 104 which is connected to the bracing member 46 by a spring 105 which constantly pulls the encoding unit in the direction of the arrow F, within the supporting frame 41. A key device illustrated in FIGURES 9A and 9B serves to position the bar unit in one of two positions within the supporting frame. A device illustrated as a variant in FIGURES 12, 13, 14 and 15 may serve to position an encoding unit in one of three positions. For the positioning of a two-position unit, FIGURES 7, 9A and 9B show blades 107 and 108 fast with control keys disposed side-by-side. The blade 108 is provided (FIGURE 9A) with a boss 109, against which the bar 104 is urged under the action of the spring 105 (FIGURE 4*a*). FIGURE 10 shows a part of an encoding bar 80A in the position corresponding to the position of the bar 104 in FIGURE 9A. Disposed above the encoding bar are actuating bars 36A, 36B, 36C and 36D. Under these conditions, depression of a key fast with one of the bars 36A, 36C or 36D will cause depression of the bar 80A, while depression of the bar 36B which falls into a notch in the bar 80A will have no effect on the latter. Depression of the shift key corresponding to the blade 108 of the device of FIGURE 9A produces shifting of the bar 104 to the right (FIGURE 9B) in the direction of the arrow F under the action of the spring 105 (FIGURE 4*a*). The encoding bar 80A having been shifted to the right (FIGURE 10), the positions 2A, 2B, 2C . . . of the bar 80A are brought under the actuating bars in the place of the positions 1A, 1B, 1C . . . . Under these conditions, depression of the bar 36C, which is above the position 2C of the bar 80A, causes depression of the latter, while depression of one of the bars 36A, 36B or 36D each of which is opposite to a notch in the bar 80A, will have no effect. FIGURES 12, 13, 14 and 15 show a constructional example of a shift device for a keyboard comprising an encoding unit having three encoding positions. FIGURE 16 shows an arrangement of the keys for a keyboard provided with three shift control keys, i.e. a key N for "normal," a key M for "capitals" as in a typewriter, and a key P for "punching" for controlling devices which punch record cards or tapes under the action of special keys S of the keyboard. These keys permitting special utilization of the keyboard will preferably be of different colour from the other keys of the keyboard, either wholly or in part.

Figure 12:
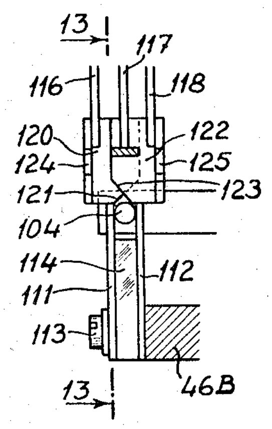
Figure 13:
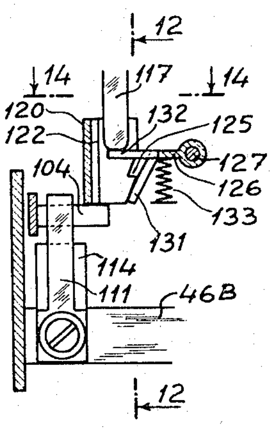
Figure 14:
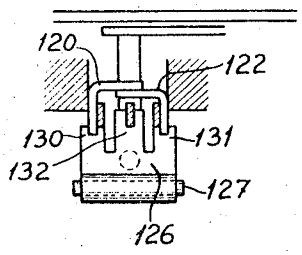
Figure 15:
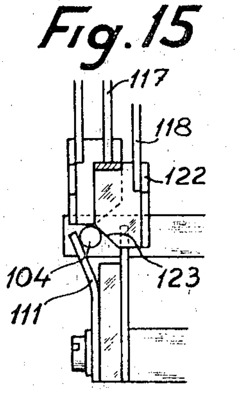

For the positioning of a three-position encoding unit, FIGURE 12 shows the bar 104, which is fast with a longitudinal member of the encoding unit and maintained between two springs 111 and 112, which also bear on a fixed unit 114 which is connected by a screw 113 to a bracing member 46B of the supporting frame. Three blades 116, 117 and 118 are connected to the keys M, N and P respectively of the keyboard illustrated in FIGURE 16. The blade 116 (FIGURE 12) connected to the key M is also connected to a member 120 formed with an inclined surface 121. A member 122 connected to the blade 118 is provided with an inclined surface 123 and disposed against the member 120. The members 120 and 122 are each formed with a notch 124 and 125 respectively. A member 126 pivoting about a pin 127 (FIGURES 13 and 14) is provided with tongues 130 and 131 which can be engaged in the notches 124 and 125 respectively. A third tongue 132 is positioned by a spring 133 in front of the end of the blade 117 fast with the key N (FIGURE 16). The members 120 and 122 are provided with guide means not shown. In the position illustrated in FIGURE 12, the bar 104 is maintained in a centre position between the springs 111 and 112. The encoding bar portion 80B illustrated in FIGURE 11 in front of the actuating bars 36K, 36L, 36M is shown in the centre position, i.e., the positions 2 of the encoding bar are opposite to the actuating bars. The operation of the manually controlled three-position shift device is as follows: Depression of the key P (FIGURE 16) fast with the blade 118 (FIGURE 15) causes depression of the member 122, of which the inclined surface 123 urges the bar 104 to the left while flexing the spring 111. When the bar 104 is in this position, the positions 3 of the bar 80B (FIGURE 11) are brought in front of the actuating bars. The member 122 is maintained in the lowered position and the encoding bars in the position 3 by the tongue 131 of the member 126 which is engaged in the notch 125 in the member 122. In order to return to position 2, depression of the key N and of the blade 117 fast therewith disengages the tongue 131 from the notch 125 and the bar 104 returns to the centre position illustrated in FIGURE 12. Depression of the key M fast with the member 120 would cause shifting of the bar 104 in the opposite direction and would bring the positions 1 of the encoding bars below the actuating bars. The shifting of the encoding unit of the keyboard may also be brought about in one direction or the other by means of electromagnetic devices. This arrangement is particularly suitable for use with an encoding keyboard connected, for example, to an accounting machine (optionally of the punching type) provided with a programming device adapted automatically to modify certain operations of the machine, and the conditions of use of the keyboard in accordance with the various zones (rows and columns) of the accounting documents dealt with in the said machine. FIGURE 19 shows an example of the construction of an electromagnetically controlled device for shifting the encoding unit of a keyboard in one direction. It is obvious that a similar device disposed symmetrically thereto could be used to shift the encoding unit in the opposite direction. Referring to FIGURE 3*a*, FIGURE 19 shows the longitudinal member 72B of an encoding unit provided with a bar 104B engaged in a slot 135 in the movable armature 136 of an electromagnet 137. The electromagnet illustrated in FIGURE 19 is of a similar type to the electromagnet 50 illustrated in FIGURES 2, 3*b*, 4*b* and 8. When this electromagnet is not energised, the movable armature 136 is brought against an abutment 138 by a spring 139 acting on the bar 104B. When the electromagnet is energised, the armature 136 is attracted and the encoding unit is shifted to the left and then returns to its initial position as soon as the said electromagnet ceases to be energised.

The spacing control mechanism is similar to that of a typewriter and comprises a space bar E (FIGURES 1, 2, 7 and 16) fast with two arms 140 and 141 keyed on a shaft 142 (FIGURES 2, 3*a* and 3*b*) which extends through the mechanism of the keyboard. Fixedly mounted on the shaft 142 is a lever 143 which closes a contact 144 when the space bar E is depressed, the latter thereafter being returned by a spring 145 into an upper position which is determined by an abutment 146 (FIGURE 7).

The transmission of a coded indication resulting from the closure of a combination of contacts consequent upon the depression of an encoding key of the keyboard takes place as follows: The encoding unit being in a position determined by one of the described positioning devices, depression of an encoding key causes depression of the actuating bar which is fast therewith and depression of the encoding bar or bars not provided with notches in vertical alignment with the depressed actuating bar. Depression of each encoding bar produces the engagement of the cranked end 65 of the corresponding intermediate member in the longitudinal slot 60 of the movable armature of the electromagnet 50. At the same time, depression of the bar 103 (FIGURE 3*a*) resulting from the depression of at least one encoding bar opens the contact 52B and closes the contact 52A, which energises the electromagnet 50 through a control and holding circuit which will hereinafter be described. Since the electromagnet 50 is energised, the armature 54 is attracted and takes up the position indicated in FIGURE 8. In this position, the intermediate member 56, of which the cranked end 65 is engaged in the slot 60, pivots about the pin 55, and the lip 51 acting on the central blade of the contact 57 opens the contact 57B and closes the contact 57A. Closure of the armature 54 of the electromagnet 50 brings the edge 66 of the said armature under the cranked end of the intermediate members which have not been depressed, and as long as the electromagnet is energised prevents lowering of the encoding bars which have not been depressed before the said closing. Under these conditions, the operator cannot depress another key as long as the electromagnet is maintained in the energised condition. A keyboard according to the invention may be used to control both cyclically operating machines and acyclically operating machines. In the case of cyclically operating machines, each manipulation of the keyboard is stored for a period sufficient for one operating cycle of the controlled machine. The diagram of FIGURE 18 shows the basic circuit arrangement of a relay device employed in combination with the keyboard to control a acyclic machine, i.e. a machine whose rythme follows that of the keyboard. In this case, however, it is necessary for the closing of the encoding contacts to be automatically effected during a minimum time which is sufficient to ensure correct performance of the controls independently of the time during which the keys are depressed by the operator, the keyboard performing under these conditions a storage function of controlled duration.

In the case of cyclically operating machines, the storage function of the keyboard is controlled by the machine which is controlled by the keyboard, i.e. the electromagnet 50 which is energised as soon as an encoding key has been correctly depressed remains energised until all the closed encoding contacts have been explored by pulses transmitted at each cycle by the machine. In the diagram of FIGURE 18, there have been shown four relays 151, 152, 153 and 154 which control the contacts 151A, 152A, 153A and 154A respectively. The contact 151A which is normally closed, opens when the relay 151 is energised. The other contacts, which are normally open, are closed by the energisation of the corresponding relays. The central blade of the contact 52 is connected by a line 156 to a direct-current source supplying, for example, 48 volts, and to the contacts 152A and 154A. The upper blade of the contact 52 is connected by a line 157 to the contacts 151A and 154A. The lower blade of the contact 52 is connected to the electromagnet 50 and by a line 158 to the relays 151, 152 and to the contact 152A. The contact 151A is connected by a line 159 to a resistance R, to the relay 153 and to the relay 154 through a diode D. The resistance R (50 ohms) is connected to one terminal of a condenser F (5 microfarads), of which the other terminal is connected to the negative terminal of the current source. The negative terminal is connected by a line 160 to the relay 153 and to the contact 153A. A line 161 connects the electromagnet 50 and the relay 151, 152 and 154 to the other terminal of the contact 153A. Since the contact 52B is normally maintained closed by the action of the central blade of the contact 52, the line 157 is under voltage and, through the closed contact 151A, energises the relay 153 (which closes its contact 153A), whereby the relay 154 is energised (through the diode D, the contact 153A then being closed), and the condenser F is charged or maintained charged through the resistance R. Since the relay 154 is energised, the contact 154A is closed and shunts the contact 52B. If an encoding bar is depressed due to depression of an encoding key, the bar 103 is depressed (FIGURES 3*a* and 18) and opens the contact 52B. Opening of the contact 52B alone has no effect, since this contact is shunted by the contact 154A (closed) of the energised relay 154. Closing of the contact 52A by complete depression of the bar 103 causes energisation of the electromagnet 50 (which attracts its movable armature), energisation of the relay 151 (which opens its contact 151A) and energisation of the relay 152 which closes its contact 152A, which shunts the contact 52A. From this instant, whether the contact 52A is maintained in the closed position or not, the duration of the energisation of the electromagnet 50 is determined by the discharge current of the condenser F, which energises the relays 154 and 153 for a predetermined time, whereafter, since the relay 153 is no longer energised, its contact 153A opens and breaks the return circuit of the relay 152, which opens the contact 152A by which it was energised simultaneously with the electromagnet 50 and the relay 151. The diode D prevents the relay 153 from being maintained in the energised condition through the relay 154. The contact 154A is also open. Under these conditions, despite the fact that the contact 52A is maintained closed owing to 103 being in the depressed position, no relay, nor the electromagnet 50 is energised. When 103 rises after release of the key by which it was depressed, the movement of the central blade of the contact 52 into the centre position has no effect, and closing of 52B (return into the inoperative position) permits energisation of the relay 153 by the contacts 52B and 151A, which are closed. The closing of the contact 153A permits energisation of the relay 154, which closes its contact 154A, and the condenser F can be recharged across the resistance R. Of course, any device equivalent to the above-described device could be employed, if necessary, in accordance with the intended applications.

FIGURE 17 diagrammatically illustrates a wiring arrangement for an encoding keyboard adapted to be connected, for example, to an accounting machine provided with an eight-position code tape puncher, in which the control keyboard also transmits the coded combinations to be punched. This keyboard is provided with a row of contacts RC (FIGURE 2) supported by a plate H fixed to the side pieces 20 and 21 of the keyboard (FIGURES 3*a*–3*b*) by screws. The upper rider 27 of each key mechanism is provided with an insulating dog 32 which, when the corresponding key is depressed, closes the contact RC situated opposite to it. The first two contacts CM and CP of the row of contacts RC (FIGURE 17) correspond respectively to the keys M and P (FIGURE 16) for controlling the positioning of a three-position encoding unit controlled by the device illustrated in FIGURES 12 to 15. The contacts C, T, C, correspond to the encoding keys, which are provided with actuating bars 36 (FIGURES 2 and 3*b*). The contacts CZ1, CZ2 and CZ3 (FIGURE 17) correspond to the keys Z1, Z2 and Z3 of the keyboard (FIGURES 1 and 16), these keys also controlling contacts CZ11, CZ21 and CZ31 supported by an insulating support fast with the side piece 21 and of which the connecting terminals may be seen in FIGURE 3. The encoding keys TC are fast with the actuating bars 36 disposed above the encoding bars 80, 81 . . . which control respectively contacts C80, C81 . . ., through intermediate members. These contacts form part of the encoding contacts 53 (FIGURES 3*b* and 4*b*). The contact 52 (FIGURES 3*a*, 4*a*, 17 and 18) is actuated by the bar 103 and controls the electromagnet 50 through the circuits illustrated in FIGURE 18. There has also been shown in FIGURE 17 the electromagnet 137 of an electromagnetically acting shift device illustrated in FIGURE 19, with a pilot lamp L connected to the terminals of the electromagnet to indicate by a visual reference mark the position of the encoding unit, depending upon whether the said electromagnet is energised or not. Switches $I_1$, $I_2$ . . . $I_7$ are indicated for placing in and out of circuit various parts of the electric circuits of the keyboard. These contacts may be manually actuated or remote-controlled by means of electromagnets G. The cable CD (FIGURES 1 and 17) comprises all the conductors for connecting the keyboard to a machine. It is obvious that the described example has no limiting character and that any adaptations may be made in accordance with the requirements and applications.

I claim:

1. Keyboard for the transmission of coded indications by means of a number of electric conductors to which voltage is applied separately or in combination in accordance with a code, the said keyboard comprising a series of keys for the establishment of indications, each of the said keys being fast with an actuating bar disposed transversely of and above a series of encoding bars disposed parallel to one another, each encoding bar being formed with notches situated in positions below the actuating bars and in such manner that depression of a transmission key and of the actuating bar fast therewith for the transmission of an indication also depresses those encoding bars situated below them, which are not formed with notches in the positions situated below the actuating bar which is depressed, an electromagnet, displaceable intermediate members disposed one below each encoding bar and above a groove formed longitudinally in the movable armature of the said electromagnet which actuates the said intermediate members, the said groove being so formed that, when the electromagnet is not energised, depression of one or more encoding bars by manipulation of a transmission key lowers the intermediate member corresponding to each depressed encoding bar and engages it in the groove of the movable armature of the electromagnet, depression of at least one of the encoding bars thereafter closing a first electric contact by which the said electromagnet is energised and attracts its movable armature, which carries with it in its movement the intermediate member or members engaged in the groove in the said armature, each of the intermediate members thus carried along closing another electric contact for applying voltage to one of the conductors serving for the coded transmission of an indication, the displacement of the said movable armature as a result of the energisation of the said electromagnet bringing under the intermediate members not engaged in the groove in the movable armature another portion of the said armature which prevents the engagement of other intermediate members and depression of other encoding bars as long as the said electromagnet is energised.

2. A keyboard according to claim 1, wherein the encoding bars are guided in a movable support displaceable in the longitudinal direction of the said encoding bars, the said support being adapted to be positioned in one of a number of positions by means of positioning members in such manner as to bring below the actuating bars different portions of all the encoding bars, the said bars being provided with different combinations of notches permitting of controlling the transmission of data in accordance with one of a number of codes which is determined by the position imparted to the movable support of the encoding bars by means of the members for the positioning of the said support.

3. A keyboard according to claim 2, wherein certain keys of the keyboard are mechanically coupled to the movable support of the encoding bars and permit of positioning the said movable support in a predetermined position below the actuating bars for the transmission of indications in accordance with a predetermined code depending upon the position imparted to the said support in the keyboard by means of the said keys.

4. A keyboard according to claim 2, wherein the support of the encoding bars is positioned in the keyboard by means of electromagnetic control members comprising an electromagnet whose movable armature is mechanically coupled to the said support so that when the said electromagnet is not energised the encoding bars bring below the actuating bars combinations of notches arranged for the transmission of indications in accordance with a predetermined code, and when the said electromagnet is energised the latter attracts its movable armature, which displaces the said support and the encoding bars bring below the actuating bars combinations of notches arranged for the transmission of indications in accordance with another code, the said electromagnet being energised, maintained energised or de-energised under the control of keys of the keyboard or under the control of contacts actuated by devices coupled to the said keyboard.

5. A keyboard according to claim 1, wherein the electromagnet for the actuation of the intermediate members after having been energised by the closing of the first electric contact is thereafter maintained energised for a time determined by the discharge of a condenser and independently of the period during which a transmission key is depressed and maintained in this position.

No references cited.

NEIL C. READ, *Primary Examiner.*

T. A. ROBINSON, *Assistant Examiner.*